(12) United States Patent
Dykman et al.

(10) Patent No.: US 7,673,932 B2
(45) Date of Patent: Mar. 9, 2010

(54) SYSTEM TO ESTABLISH A TRIM EDGE FOR A VEHICLE ROOF WINDOW

(75) Inventors: Michael C. Dykman, Lake Orion, MI (US); James R. Mestemaker, Lambertville, MI (US); Brian Cristea, Royal Oak, MI (US); Lynn Lashbrook, Dearborn, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 385 days.

(21) Appl. No.: 11/737,325

(22) Filed: Apr. 19, 2007

(65) Prior Publication Data

US 2008/0258507 A1 Oct. 23, 2008

(51) Int. Cl.
*B60J 7/043* (2006.01)
(52) U.S. Cl. .............................. 296/216.07; 296/216.09
(58) Field of Classification Search ............ 296/216.07, 296/218, 210, 214, 36, 29
See application file for complete search history.

(56) References Cited

U.S. PATENT DOCUMENTS

| | | | | |
|---|---|---|---|---|
| 4,127,302 A | * | 11/1978 | Green | 296/218 |
| 4,418,956 A | * | 12/1983 | Yamamoto et al. | 296/216.09 |
| 4,428,170 A | * | 1/1984 | Wooten et al. | 52/204.56 |
| 4,541,665 A | * | 9/1985 | Draper et al. | 296/218 |
| 4,728,146 A | * | 3/1988 | Srdinko | 296/216.06 |
| 4,783,116 A | * | 11/1988 | Hough | 296/216.07 |
| 4,891,085 A | * | 1/1990 | Mulligan | 156/216 |
| 4,923,245 A | | 5/1990 | Kuwabara | |
| 5,028,089 A | * | 7/1991 | Schmidhuber et al. | 296/216.09 |
| 5,275,865 A | * | 1/1994 | Nicolay | 428/174 |
| 5,280,991 A | * | 1/1994 | Weiland | 296/214 |
| 5,297,843 A | * | 3/1994 | Yada et al. | 296/146.15 |
| 5,664,827 A | | 9/1997 | Mori et al. | |
| 5,826,934 A | * | 10/1998 | Wooten | 296/216.07 |
| 6,375,253 B1 | * | 4/2002 | Verkaik et al. | 296/214 |
| 7,036,876 B2 | | 5/2006 | Senoo et al. | |
| 7,144,076 B2 | * | 12/2006 | Wendler et al. | 296/210 |
| 2008/0100100 A1 | * | 5/2008 | Huisman | 296/215 |
| 2008/0258507 A1 | * | 10/2008 | Dykman et al. | 296/216.07 |

* cited by examiner

*Primary Examiner*—Kiran B. Patel
(74) *Attorney, Agent, or Firm*—Brooks Kushman P.C.

(57) ABSTRACT

A headliner and bracket cooperate to define a trim edge around a vehicle sunroof. The bracket may include a lip the wraps around an edge of the headliner and trim associated with the headliner.

6 Claims, 4 Drawing Sheets

SYSTEM TO ESTABLISH A TRIM EDGE FOR A VEHICLE ROOF WINDOW

BACKGROUND OF THE INVENTION

1. Field of the Invention

The invention relates to systems to establish a trim edge for a vehicle roof window.

2. Discussion

Variations may occur in the edgefold height of trim around a sunroof due to manufacturing tolerances or wear of edge-folding equipment.

SUMMARY

Embodiments of the invention may take the form of a system for providing a trim edge for a roof window in a vehicle having a cabin partially defined by a roof. The system includes a cover stock to provide an aesthetic surface for the roof of the cabin and a substrate to support the cover stock and including an angled portion defining an opening for the roof window. The substrate includes first and second surfaces. The cover stock covers the first surface of the angled portion of the substrate. The system also includes a bracket, having a finishing edge and attached with the second surface of the substrate, to support the angled portion of the substrate. The finishing edge at least partially defines the trim edge for the roof window.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION

Figure 1A:
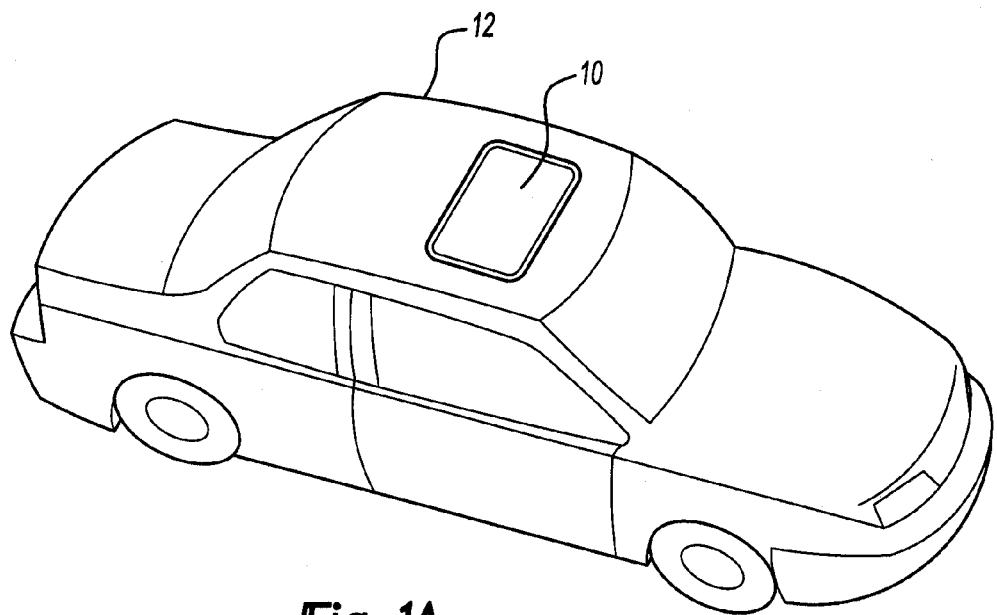
FIG. 1A is an exterior perspective view of a vehicle sunroof and shows the location of the sunroof.

FIG. 1A is an exterior perspective view of sunroof 10 of vehicle 12 showing the location of sunroof 10.

Figure 1B:
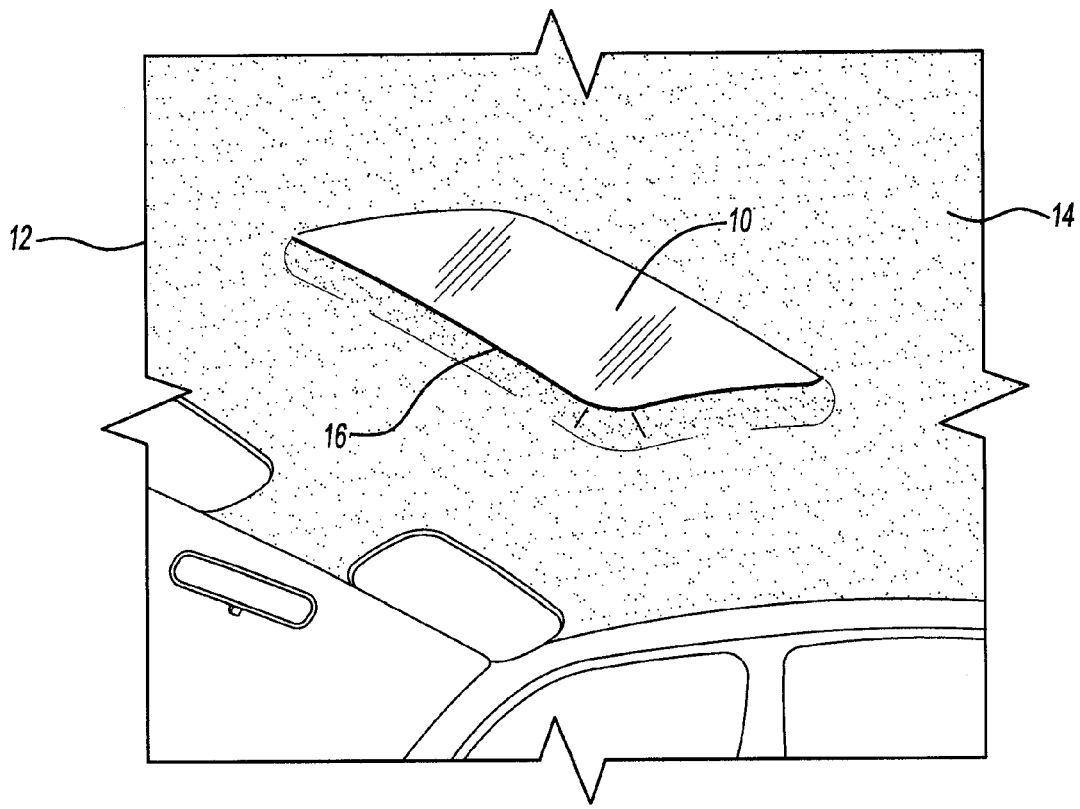
FIG. 1B is an interior perspective view of the sunroof of FIG. 1A and shows the trim edge defining the perimeter of the roof relative to the sunroof.

FIG. 1B is an interior perspective view (cabin view) of sunroof 10 of vehicle 12 showing trim edge 16 defining the perimeter of roof 14 relative to sunroof 10. As described below, trim edge 16 provides a finished edge around sunroof 10.

Figure 2:
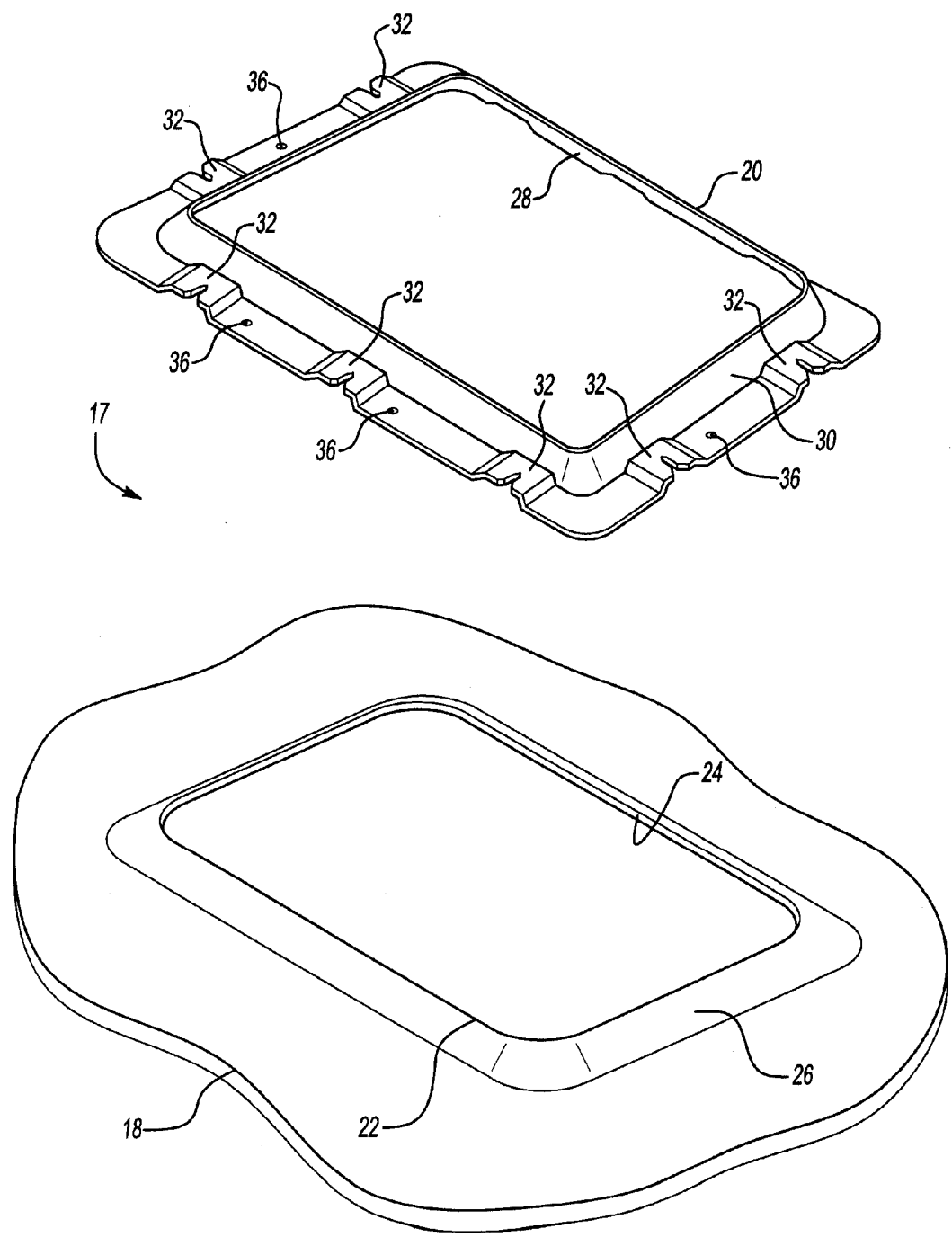
FIG. 2 is an exploded assembly view of portions of an edge system used to create the trim edge of FIG. 1B in accordance with an embodiment of the invention and shows a headliner and reinforcement.
Figure 5:
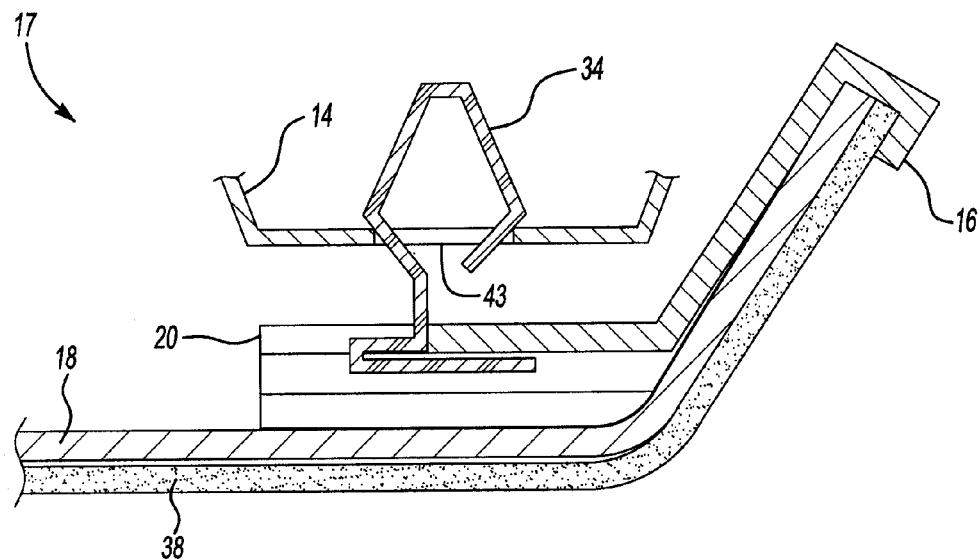
FIG. 5 is another side view, in cross-section, of the edge system of FIG. 2, when assembled, and shows the attachment between the reinforcement and roof in detail; and, FIG. 6 is another side view, in cross-section, of an alternative embodiment of the edge system of FIG. 2, when assembled, and shows the lip having a curved profile and the attachment between the reinforcement and the roof in detail.

FIG. 2 is an exploded assembly view of portions of edge system 17 used to create trim edge 16 (FIG. 1B) showing headliner 18 and reinforcement 20. Headliner 18 includes shaped opening 22, A-surface 24, and B-surface 26. Shaped opening 22 provides access to sunroof 10 (FIG. 1B) from the vehicle cabin. Reinforcement 20 includes bottom surface 28 and top surface 30. Bottom surface 28 of reinforcement 20 and B-surface 26 of headliner 18 are attached as described below. Reinforcement 20 also includes clip retainers 32 which receive a portion of push clips 34 (FIG. 5). Reinforcement 20 is attached with roof 14 (FIG. 1B) via push clips 34 as described below. Reinforcement 20 further includes holes 36 for hot melt bonding of reinforcement 20 to headliner 18.

Figure 3:
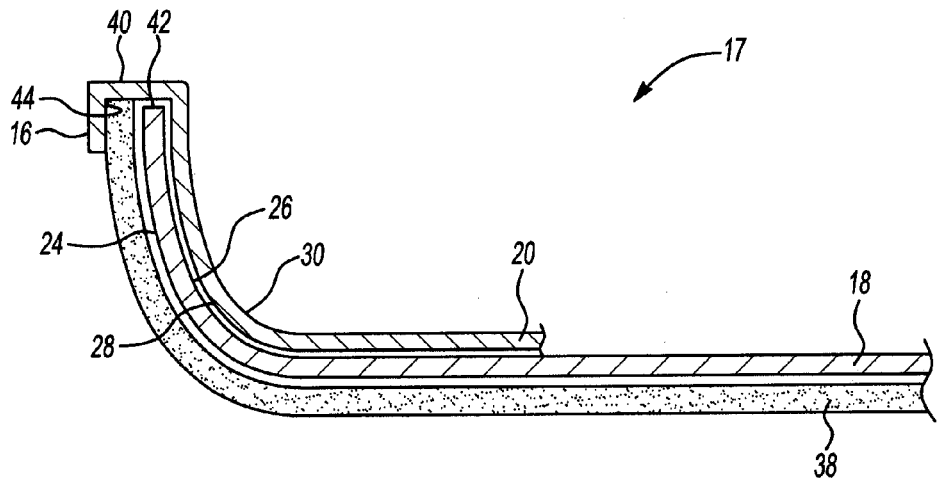
FIG. 3 is a side view, in cross-section, of the edge system of FIG. 2, when assembled, and shows the trim edge in detail.

FIG. 3 is a side view, in cross-section, of edge system 17 of FIG. 2, when assembled, showing trim edge 16 in detail. Cover 38, e.g., fabric, is adhered, e.g., glued, to A-surface 24 of headliner 18. Reinforcement 20 includes lip 40, which may be flexible, that wraps around edge 42 of headliner 18 and covers a portion of cover 38 adhered to A-surface 24 of headliner 18. Lip 40, thus, forms trim edge 16. In alternative embodiments, lip 40 may have a different profile, e.g., curved.

During assembly, edge 42 of headliner 18, and any portion of cover adhered with A-surface 24 of headliner 18 near edge 42, may be pushed into lip 40 such that edge 42 is obscured from occupant view. Also, if lip 40 is flexible, it may be pulled around edge 42 such that edge 42 is obscured from occupant view.

Lip 40 includes interior surface 44. In the embodiment of FIG. 3, interior surface 44 of lip 40 is in contact with cover 38 such that there is no space between interior surface 44 and cover 38. In other embodiments, a gap may exist between interior surface 44 and cover 38. Whether there is a gap may depend on design requirements or visual preferences.

Figure 4:
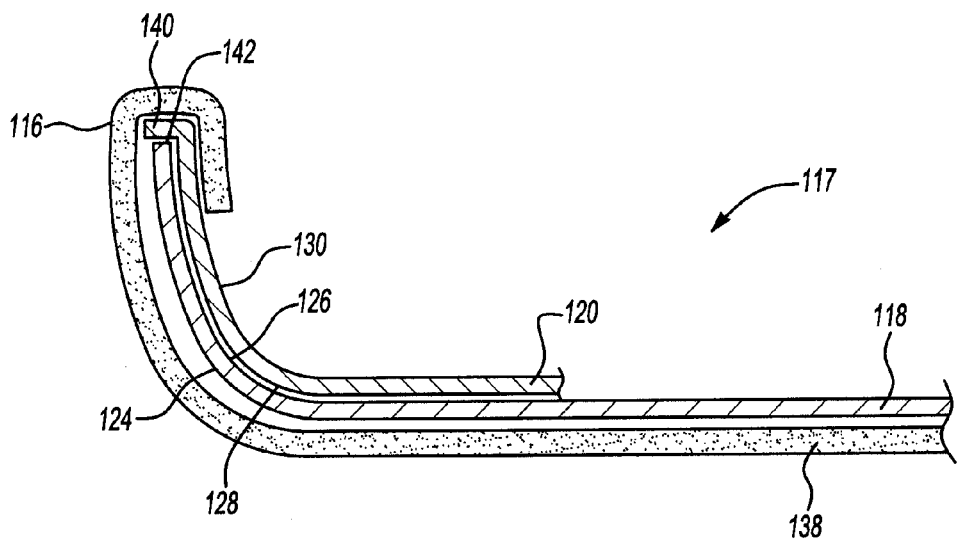
FIG. 4 is a side view, in cross-section, of an alternative embodiment of the edge system of FIG. 2, when assembled, and shows the trim edge in detail.

FIG. 4 is a side view, in cross-section, of an alternative embodiment of edge system 117 of FIG. 2, when assembled, showing trim edge 116 in detail. Numbered elements that differ by increments of 100 have similar descriptions, e.g., headliners 18, 118 (substrates) have similar descriptions. Reinforcement 120 (bracket) includes lip 140 (rigid finishing portion) that wraps partially around edge 142 of headliner 118. Cover 138 (cover stock) is adhered to A-surface 124 (first surface) of headliner 118 and wraps around lip 140 of reinforcement 120. Cover 138 is adhered to top surface 130 (rear surface) of reinforcement 120. In the embodiment of FIG. 4, cover 138 in combination with lip 140 forms trim edge 116.

In the embodiments described above, edges 42, 142 do not define trim edges 16, 116 respectively. Rather, in the embodiment of FIG. 3, lip 40 defines the distance between sunroof 10 and trim edge 16. In the embodiment of FIG. 4, lip 140 and cover 138 define the distance between sunroof 110 and trim edge 116. These configurations offer better control over the distance between a sunroof and trim edge. The location of edges 42, 142 relative to the substantially flat portions of headliners 18, 118 respectively depends on manufacturing tolerances that result from manufacturing processes such as thermoforming and water jet cutting. The location of lips 40, 140 relative to the substantially flat portions of headliners 18, 118 respectively may be formed with more controllable processes.

FIG. 5 is another side view, in cross-section, of edge system 17, when assembled, showing the attachment between reinforcement 20 and roof 14 in detail. Push clip 34, which mounts in reinforcement 20 as described above, is pushed into roof 14.

Figure 6:
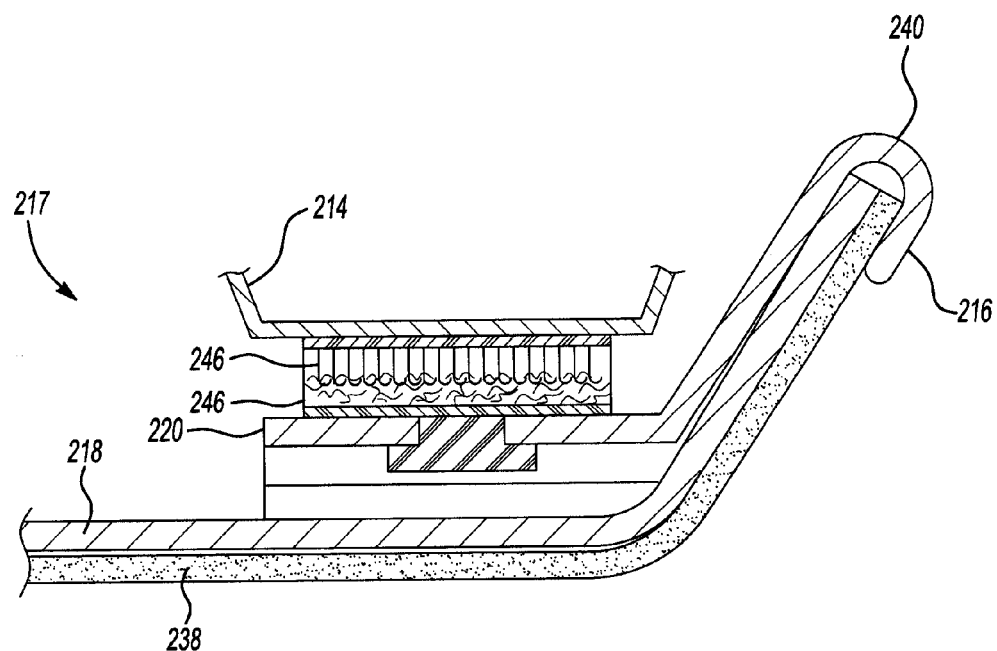

FIG. 6 is another side view, in cross-section, of an alternative embodiment of edge system 217, when assembled, showing lip 240 having a curved profile and the attachment between reinforcement 220 and roof 214. Roof 214 and reinforcement 220 each include self-aligning fasteners, e.g., Velcro®, which are used to attach reinforcement 220 to roof 214. Reinforcement 220 may be attached to roof 214, however, in any desired fashion.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for providing a trim edge for a roof window in a vehicle having a cabin partially defined by a roof, the system comprising:
    a cover to provide an aesthetic surface for the roof of the cabin;
    a headliner to support the cover and including an angled portion defining an opening for the roof window wherein the headliner includes an A-surface, a B-surface, and an edge and wherein the cover covers the A-surface of the angled portion of the headliner; and
    a reinforcement having bottom and top surfaces, wherein the bottom surface of the reinforcement is attached with the B-surface of the headliner to support the angled portion of the headliner, wherein the reinforcement includes a lip that extends around at least a portion of the edge of the headliner, and wherein the cover is wrapped around the lip of the reinforcement and attached to the top surface of the reinforcement thereby providing a trim edge for the roof window.

2. The system of claim 1 wherein the reinforcement and roof are mechanically attached.

3. The system of claim 2 wherein the reinforcement and roof are attached with a self mating fastener.

4. The system of claim 3 wherein the reinforcement includes a feature to mount the self mating fastener.

5. The system of claim 1 wherein the reinforcement and roof are attached with a push clip.

6. The system of claim 1 wherein the headliner and reinforcement are bonded together.

\* \* \* \* \*